INVENTOR.
JAMES W. ENDRESS

July 6, 1965  J. W. ENDRESS  3,192,790
TRANSMISSION GEARING

Filed Jan. 29, 1962  2 Sheets-Sheet 2

INVENTOR.
JAMES W. ENDRESS

BY Raymond Curtin

ATTORNEY.

United States Patent Office 3,192,790
Patented July 6, 1965

3,192,790
TRANSMISSION GEARING
James W. Endress, Syracuse, N.Y., assignor to Carrier Corporation, Syracuse, N.Y., a corporation of Delaware
Filed Jan. 29, 1962, Ser. No. 169,507
5 Claims. (Cl. 74—410)

This invention relates to transmission gearing, more particularly to that utilized for transmitting the rotational energy of a drive shaft to the driven shaft at an increase, or decrease, of rotational speed, and still more particularly, to the transmission of rotational energy to the impeller shaft of high speed centrifugal compressors.

The relatively high speeds at which it is desired to operate centrifugal compressors necessitate the use of speed increasing gearing between the drive motor shaft and the impeller shaft of the compressor, since the relatively high torques required are most readily provided by relatively slow speed motors. For purposes of economy of spacing, the motor shaft extends parallel to the impeller shaft, and the transmission gearing employed between these shafts should desirably lie in a plane perpendicular thereto.

In arranging this speed reducing or increasing transmission gearing between the drive motor shaft and the impeller shaft, a variety of problems are engendered. Thus as in all toothed gearing, it is desirable to insure equal distribution of gear tooth loading over the entire operating conditions of the equipment. In order to accomplish this, precise machining and assembly techniques are required with a resultant increase in production cost. Failure to insure equal load distribution over the gear teeth results in reduced service life, increased noise and vibration.

It is with the above problems and desiderata in mind that the present means have been evolved, means including apparatus implementing the transmission of forces between the motor shaft of a drive motor and the driven shaft or impeller shaft of a centrifugal compressor by means of a toothed gear transmission in a way permitting the equal distribution of loading over the gear teeth, without necessitating precise machining, assembly and maintenance.

It is accordingly a primary object of this invention to provide an improved gear transmission.

Another object of the invention is to provide a gear transmission particularly adapted for transmitting forces between a drive motor, and the impeller shaft of a centrifugal compressor.

A further object of the invention is to provide an improved gear transmission which does not require precise and costly machining and assembly techniques to obtain equal gear tooth load distribution.

It is also an object of the invention to provide a novel gearing arrangement in which any distortions in the transmission components will be automatically accommodated to obtain equal load distribution.

It is a further object of the invention to provide a gear transmission in which gear wear will be minimized.

A further object of the invention is to provide novel means minimizing maintenance requirements of a centrifugal compressor.

These and other objects of the invention which will become hereafter apparent are attained by provision of a novel transmission between the shaft of a drive motor and the impeller shaft of a centrifugal compressor. The novel transmission includes a drive gear formed of two axially spaced toothed surfaces or gear portions adapted for securement to the shaft of the drive motor. A toothed member, illustrated as a spline, is arranged on the driven impeller shaft of the centrifugal compressor, and a novel pinion or intermediate gear is provided to transmit forces between the drive gear and spline of the impeller shaft.

This novel pinion is formed with two axially spaced toothed external gear surfaces arranged for meshing with the spaced gear portions of the drive gear, and a toothed internal spline surface on the pinion gear meshes with the teeth of the driven spline of the impeller shaft. A bearing is provided between the spaced gear teeth of the pinion gear with said bearing supported for rocking movement to permit angular displacement of said pinion gear to insure rotation on its normal axis of rotation with respect to the driven gear.

An important feature of the invention resides in the fact that the pinion gear supported on the arcuate movable bearing provides for free floating orientation of the pinion gear with respect to the drive gear and driven spline thereby insuring a uniformity of surface contact between mating gear teeth and permitting equal load distribution over the mating gear teeth.

The specific details of a preferred embodiment of the invention, and their mode of functioning, will be made most manifest and particularly pointed out in clear, concise and exact terms in conjunction with the accompanying drawing, wherein.

Figure 1:
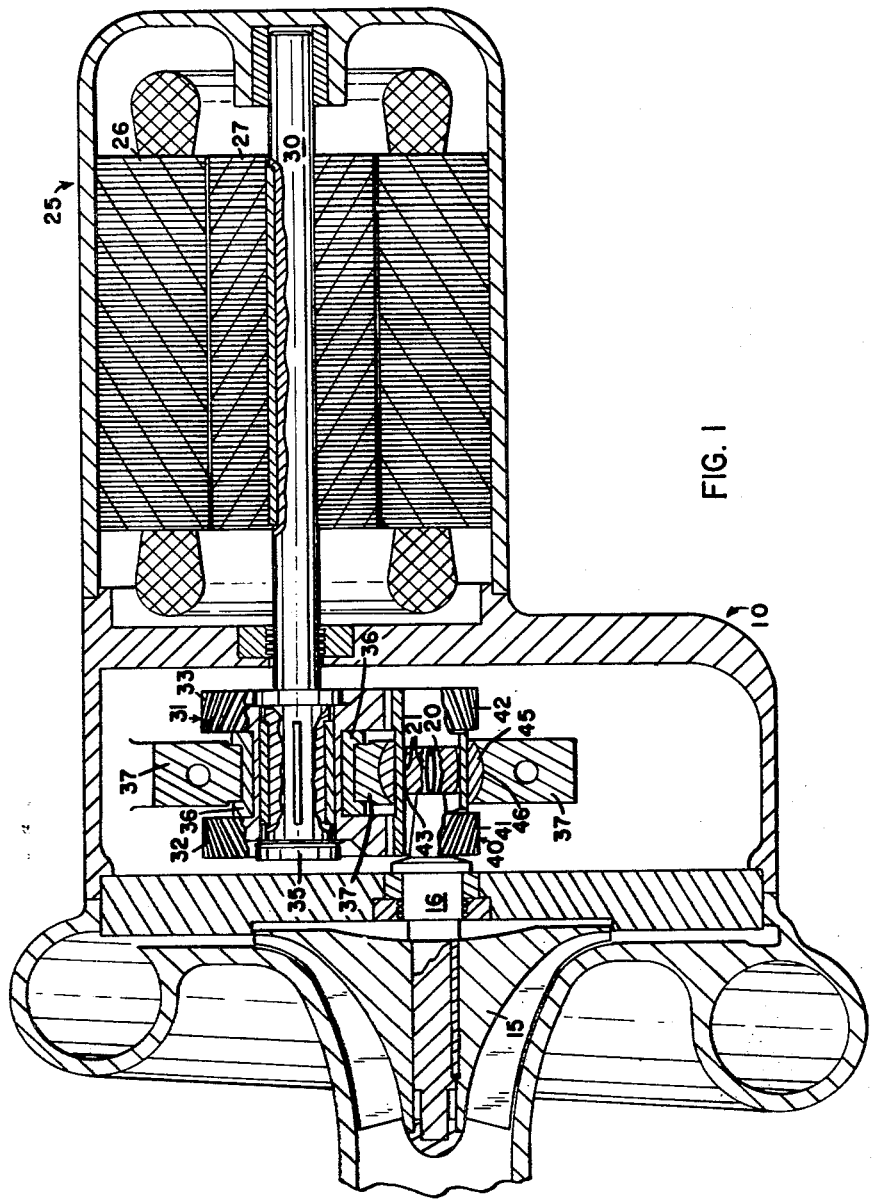
FIGURE 1 is a cross-sectional view through the drive shaft of a driving motor and the driven impeller shaft of a centrifugal compressor showing the novel transmission gearing as arranged between the motor drive shaft and the driven impeller shaft with the compressor and drive motor shown schematically.

Referring now more particularly to the drawing, the compressor 10 is shown formed with an impeller 15 driven by driven impeller shaft 16.

Driven impeller shaft 16 has driving spline teeth 20 formed on an exposed end thereof (to the right as viewed in the drawing). Contact surfaces of the spline teeth 20 are crowned as at 21 for a purpose to become hereafter apparent.

A drive motor 25, as seen to the right in the drawing is formed with a stator 26 and a rotor 27 in conventional fashion. Rotor 27 is keyed to drive shaft 30. Suitable thrust bearings and seals are provided for motor shaft 30 as will be understood by those skilled in the art.

A drive gear 31 having two axially spaced toothed surfaces or gear portions 32 and 33 respectively is secured by means of a conventional fastening element 35 to the end of motor shaft 30. The gear teeth are helically arranged with the inclination of those on portion 32 being opposite to those on portion 33 as illustrated. A split bearing 36 is arranged between the spaced gear portions 32 and 33 as viewed in the drawing to provide bearing support for drive gear 31, and one end of the motor's shaft.

A pinion or gear 40 is arranged between drive gear 31 and driven spline 20. Pinion gear 40 is formed in the shape of a sleeve or cylinder having two axially spaced externally extending toothed gear surfaces 41 and 42 respectively, with a spacing and configuration such as to permit meshing with the spaced gears 32 and 33 of drive gear 31. An internal spline 43 is arranged within the cylinder to mesh with the teeth of driven spline 20.

Bearing 45 is arranged between spaced pinion gear teeth 41 and 42. An arcuate surface 46 on bearing 45 rests on a mating arcuate surface of supporting block or member 37 to provide a pivot mount whereby pinion gear 40 may be displaced angularly with respect to its axis. It is preferred that the center of curvature of the arcuate surfaces be coaxial with the center of curvature of the crown 21 of driven spline teeth 20.

Figure 2:
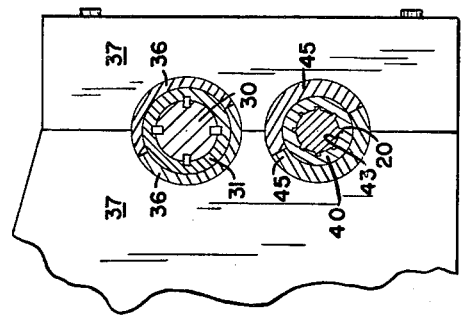
FIGURE 2 is a cross-sectional view taken along an axis normal to the axis of the compressor.

As will be understood by those skilled in the art, the above described gearing, shafts and bearings are enclosed in an appropriate housing providing necessary support for the bearings, with lubrication passages and seals where required in conventional fashion, note FIGURE 2.

Figure 3:
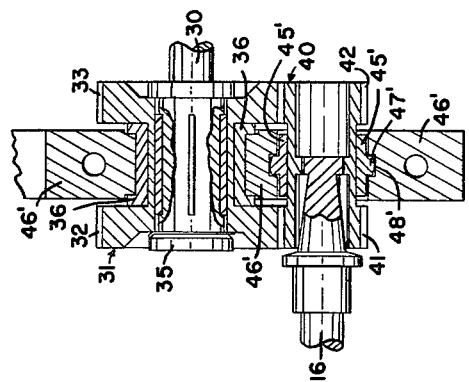
FIGURE 3 is a cross-sectional view of a modification of the invention.

FIGURE 3 shows a modification of the pinion gear support which can be used in place of the arcuate bearing 45 and/or the crowned spline 20. In this instance the spline length has been reduced to permit slight angular displacement of the pinion 40 by virtue of the clearances between the internal spline 43 and external spline 20 of the driven shaft. The bearing 45' is retained in its housing 46' by a centrally located flange 47' with sufficient clearance on the sides to permit limited realignment. The radial support of the bearing is taken over a cylindrical portion 48' on the outside of the flange where the radial clearance and length will also permit limited realignment of the bearing 45.

With further reference to both FIGURE 1 and FIGURE 3, both the drive gear 31 and the pinion gear 40 have been made so they can be turned end for end about their rotating axis to permit increased usage of the gear and pinion in the event of damage to one side of the gear teeth. This additional feature will provide more improved tooth bearing performance.

The aforedisclosed novel transmission gearing has been described in connection with a centrifugal compressor where it finds particular applicability as a speed increaser in transmitting the forces from a drive motor to the impeller shaft of the compressor. It will, however, be understood by those skilled in the art, that the inventive concept may be embodied in transmission gearing in a variety of environments other than a compressor. The novel effects provided by the instant gearing arise due to the floating action of the pinion gear 40 which may be angularly displaced from its axis to accommodate distortions in the drive and driven spline whereby there will be equal loading over all contacting gear teeth, and there will be automatic accommodation of readjustment or alignment of the gearing components to equalize load distribution.

In use, the stator 26 is energized to impart rotation to rotor 27 which, in turn, rotates drive shaft 30. Drive gear 31 which is fastened to drive shaft 30 thus also is set into rotation.

Drive gear 31 which is formed with two axially spaced toothed gear portions 32 and 33 meshes with pinion gear 40 which is similarly formed with axially spaced toothed gear portions 41 and 42. Any displacement in gear 31 or drive shaft 30 is accommodated by a change of position of pinion gear 40. Thus, in the event of a bending due to loading on drive shaft 30, the angular displacement in drive gear 31 with respect to the axis will be accommodated by angular movement of pinion gear 40 on bearing 45. The arcuate surface 46 of bearing 45 can, as will be seen in the drawing, readily permit an angular displacement of the pinion gear. The driven impeller shaft spline 20 accommodates this angular displacement by virtue of crown 21 on the surfaces of the gear teeth 20 in the embodiment disclosed in FIGURE 1 and by the normal tolerances in the embodiment disclosed in FIGURE 3.

It is thus seen that the free floating pinion gear which is formed in two segments 41 and 42 mating with the drive gear segments 32 and 33 respectively, serves to accommodate any torsional disorientation in the drive gear 31, while the bearing 45 permits angular displacement of the pinion gear to accommodate an angular displacement from the axis arising due to bending loads, or other displacement resulting from irregularities in fabrication or assembly of the components.

By use of the novel transmission, the gear transmission components are substantially self-adjusting in response to load and operating conditions, thus minimizing required manufacturing tolerances, and reducing maintenance costs without affecting efficiency.

The above disclosure has been given by way of illustration and elucidation, and not by way of limitation, and it is desired to protect all embodiments of the herein disclosed inventive concept within the scope of the appended claims.

I claim:
1. In a centrifugal compressor having an impeller mounted for rotation on an impeller shaft, transmission gearing for connecting the impeller shaft to a drive motor having a motor shaft, said gearing comprising: a motor gear mounted on the motor shaft, said motor gear having two axially spaced helical gear surfaces of opposite and equal helical angles; a bearing supporting said spaced helical gear surfaces for rotation; a toothed member fixed for rotation with the impeller shaft; a driven gear between said toothed member and said motor gear; a toothed surface on said driven gear engaging said toothed member; two spaced gear surfaces on said driven gear engaging said spaced gear surfaces on said motor gear; and a bearing supporting said driven gear for rotation and axial rocking relative to said motor gear, the said toothed means and the means for supporting said second gear member being located between the spaced external gear surfaces on said second gear member, whereby there will be an equalization of pressure distribution over the gear tooth faces.

2. In a gear assembly for transmitting motion from a driver shaft to a driven shaft a first gear member having spaced gear surfaces connected to one of said shafts, bearing means supporting said gear member, toothed means associated with the other of said shafts, a second gear member having an internal surface meshing with said toothed means and spaced external gear surfaces meshing with said spaced gear surfaces on said first gear member, and means for supporting said second gear member for rotation and axial rocking relative to said first gear member, the said toothed means and the means for supporting said second gear member being located between the spaced external gear surfaces on said second gear member, whereby there will be an equalization of pressure distribution over the meshing gear surfaces.

3. The invention described in claim 2 wherein the spaced gear surfaces on said first gear member include helical gear teeth of opposite and equal helical angles and the external gear surfaces on said second gear member include helical gear teeth meshing with the helical teeth on said first gear member.

4. The invention set forth in claim 3 wherein said last mentioned means includes a bearing having an arcuate surface and a bearing support having a complementary arcuate surface.

5. The invention set forth in claim 3 wherein said last mentioned means includes a bearing member provided with a flange and a block for supporting said flange.

References Cited by the Examiner
UNITED STATES PATENTS

| | | | |
|---|---|---|---|
| 1,742,385 | 1/30 | Flanders | 74—410 |
| 2,133,102 | 10/38 | Kuhns | 74—410 |
| 2,679,735 | 6/54 | Rowe | 64—9 |
| 2,951,396 | 9/60 | Kooistra | 64—9 |

DON A. WAITE, *Primary Examiner.*